United States Patent
Gunda et al.

(10) Patent No.: US 11,593,015 B2
(45) Date of Patent: Feb. 28, 2023

(54) METHOD TO ENHANCE THE DATA INVULNERABILITY ARCHITECTURE OF DEDUPLICATION SYSTEMS BY OPTIMALLY DOING READ-VERIFY AND FIX OF DATA MOVED TO CLOUD TIER

(71) Applicant: EMC IP Holding Company LLC, Hopkinton, MA (US)

(72) Inventors: Kalyan C. Gunda, Bangalore (IN); Jagannathdas Rath, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/223,557

(22) Filed: Apr. 6, 2021

(65) Prior Publication Data
US 2022/0317909 A1    Oct. 6, 2022

(51) Int. Cl.
*G06F 12/00* (2006.01)
*G06F 3/06* (2006.01)
*G06F 11/14* (2006.01)

(52) U.S. Cl.
CPC ............ *G06F 3/0647* (2013.01); *G06F 3/067* (2013.01); *G06F 3/0619* (2013.01); *G06F 3/0659* (2013.01); *G06F 11/1435* (2013.01)

(58) Field of Classification Search
USPC .......................................................... 711/162
See application file for complete search history.

(56) References Cited

U.S. PATENT DOCUMENTS

| | | | | |
|---|---|---|---|---|
| 9,087,086 | B1* | 7/2015 | Li | G06F 16/1748 |
| 9,715,505 | B1* | 7/2017 | Mondal | G06F 16/162 |
| 2003/0145210 | A1* | 7/2003 | Taylor | G06F 9/52 |
| | | | | 713/182 |
| 2004/0153416 | A1* | 8/2004 | Fujimoto | G06F 21/105 |
| | | | | 705/59 |
| 2010/0268783 | A1* | 10/2010 | Mizosoe | H04N 21/2225 |
| | | | | 709/219 |
| 2010/0274772 | A1* | 10/2010 | Samuels | G06F 16/188 |
| | | | | 707/693 |
| 2010/0325500 | A1* | 12/2010 | Bashir | G06F 11/1658 |
| | | | | 714/746 |
| 2011/0161723 | A1* | 6/2011 | Taleck | G06F 11/1469 |
| | | | | 714/E11.073 |
| 2012/0191874 | A1* | 7/2012 | Robinson | H04L 61/4552 |
| | | | | 709/245 |
| 2013/0064052 | A1* | 3/2013 | Mehra | G11B 20/1217 |
| | | | | 369/30.01 |
| 2016/0041904 | A1* | 2/2016 | Bhattacharya | G06F 16/1847 |
| | | | | 711/103 |
| 2016/0292178 | A1* | 10/2016 | Manville | G06F 16/1752 |

(Continued)

*Primary Examiner* — Mohamed M Gebril
(74) *Attorney, Agent, or Firm* — Workman Nydegger (57) ABSTRACT

Data protection operations including verification operations are disclosed. Objects written to a cloud tier are verified without reading the objects out of the cloud. A translation map is used that allows a cloud verifier engine to compare a checksum of an object generated at an local tier with a checksum of the object as stored in the cloud tier. Mismatches are identified and corrective actions can be taken by reconstructing and rewriting the object to the cloud tier. Garbage collection may be prevented from reclaiming data associated with objects that have not been verified.

18 Claims, 7 Drawing Sheets

(56) References Cited

U.S. PATENT DOCUMENTS

| | | | |
|---|---|---|---|
| 2017/0235970 A1* | 8/2017 | Conner | G06F 16/2358 |
| | | | 707/690 |
| 2018/0285384 A1* | 10/2018 | Byers | G06F 16/148 |
| 2018/0314725 A1* | 11/2018 | Subramanian | G06F 12/08 |
| 2019/0005079 A1* | 1/2019 | Li | G06F 16/2272 |
| 2019/0391875 A1* | 12/2019 | Hegde | G06F 3/064 |
| 2020/0241960 A1* | 7/2020 | Yanovsky | G06F 11/1076 |
| 2022/0100498 A1* | 3/2022 | Guim Bernat | G06F 8/71 |

* cited by examiner

METHOD TO ENHANCE THE DATA INVULNERABILITY ARCHITECTURE OF DEDUPLICATION SYSTEMS BY OPTIMALLY DOING READ-VERIFY AND FIX OF DATA MOVED TO CLOUD TIER

FIELD OF THE INVENTION

Embodiments of the present invention generally relate to data management and data protection. More particularly, at least some embodiments of the invention relate to systems, hardware, software, computer-readable media, and methods for verifying that data that has been written to storage.

BACKGROUND

Cloud storage is commonly used for a wide variety of purposes. Cloud storage, for example, is often used by data protection applications to store backups of production data. In addition, data protection systems may also use cloud storage for deduplication purposes. For example, data backed up in a local storage, which constitutes an example of a local tier, may be moved to cloud storage, which constitutes an example of a cloud tier.

When data is moved to the cloud tier from the local tier, the application moving the data relies on the cloud tier to ensure that the data is successfully written to the cloud storage. However, data can be corrupted for a variety of reasons. For example, data may be corrupted when transmitted over the wire. Writes can be dropped or written incorrectly in the cloud storage due to software bugs, hardware issues, and the like.

When data is written incorrectly, the error may not be discovered until the data is accessed again at some future time. The error may not be detected for weeks, months, or years. By the time the error is detected, it may be difficult or impossible to perform corrective actions.

In the local tier, this problem of verifying the writes can be solved by performing a read-verify on write. Every block of data that is written is read back and verified to ensure validity and correctness. If an error or issue is determined, the data can be written again or the error can be flagged such that the error is discovered closer to their point of origin.

In the cloud tier, this approach is not feasible at least because the latency and cost involved in doing a read-verify from the cloud tier is cost prohibitive. For example, if 100 Gigabytes (GB) of objects are written to the cloud tier, the application must perform 100 GB of reads from the cloud tier to verify that the objects were written correctly. Cloud data egress is costly and this method is too expensive.

In another example, the cloud storage provider may support cloud tier verification via checksums that are provided by the client. The object being uploaded is only created in the cloud tier when the checksum provided by the client matches the checksum determined by the cloud storage software for the received data. Although this may identify errors that occurred during network transfer, this does not detect errors that may occur while writing the object to the cloud storage disks.

Cloud storage providers may also generate a checksum of the object and store the checksum in the object's metadata. However, this checksum is typically generated before the object is written to disk. Consequently, this still does not detect errors that may arise when the data is written to disk. Further, there is no current way to verify the data other than reading from the cloud tier, which is expensive as previously discussed.

In addition, even if cloud objects are found to be incorrect, there is no guarantee that the local data copy is still available. Often, the local tier data is reclaimed through garbage collection after the object is committed to the cloud tier. This makes it difficult to correct the objects stored incorrectly in the cloud tier.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data management and data protection. More particularly, at least some embodiments of the invention relate to systems, hardware, software, computer-readable media, and methods for data protection include data verification. Embodiments of the invention relate to data protection operations including backup operations, restore operations, data verification operations, data correction operations, deduplication operations, transport operations and the like or combination thereof.

More specifically, embodiments of the invention relate to data verification operations. A verification framework for data moved to the cloud tier is disclosed that reduces latency and cost overhead associated with read-verify and read-verify-fix operations. Embodiments of the invention further relate to ensuring that local tier data is available in the local tier at least until data in the cloud tier is verified.

When a data protection system moves data from an local tier to a cloud tier, the data may be processed (e.g., deduplicated, compressed, encrypted, packaged, or the like). For example, a file or object may be split or chunked into segments and these segments may be deduplicated across all files in the relevant system. The segments may be packed into containers. These containers, by way of example, become objects in the cloud tier. By way of example, only, a cloud object may contain multiple segments. These objects may vary in size (e.g., 1 MB-16 MB or other size) and the average segment size may be 8 KB-32 KB or other size.

The data protection system may move data from the local tier to the cloud tier in accordance with various policies. For example, data may be moved to the cloud tier based on retention policies, based on age of the data in the local tier, or the like.

Figure 1:
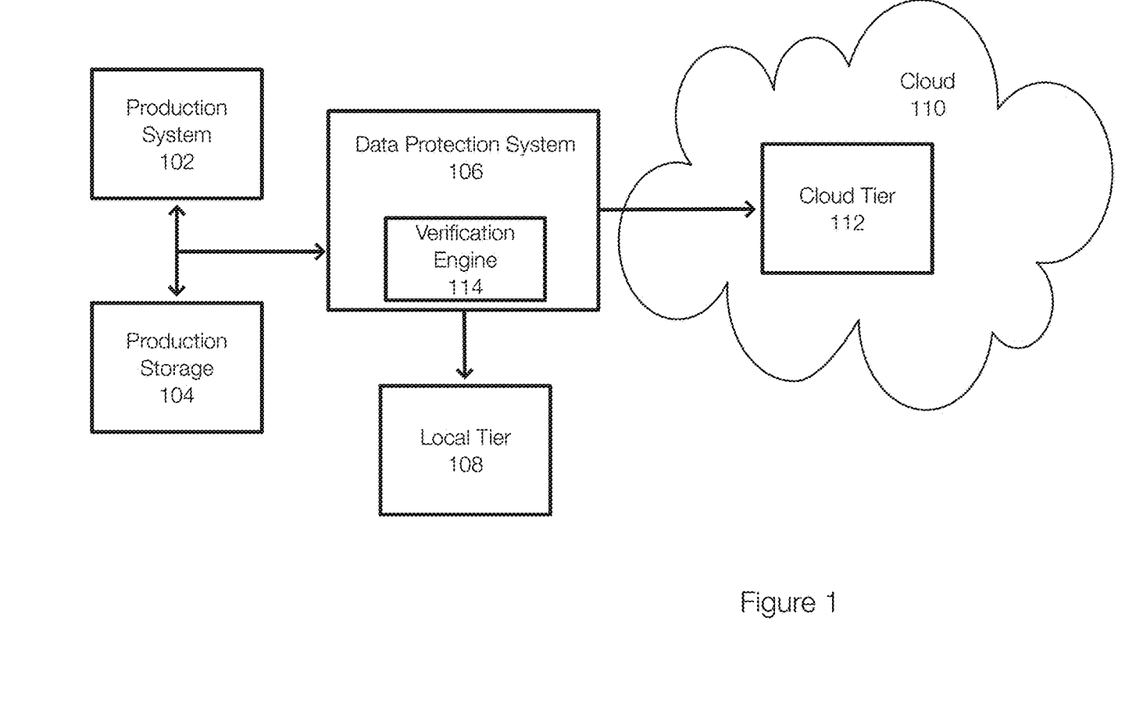
FIG. 1 discloses aspects of a data protection system configured to perform data protection operations including verification operations.

FIG. 1 illustrates an example of a data protection system that is configured to perform data protection operations including moving data from an local tier to a cloud tier and verifying the data moved to the cloud tier. More specifically, FIG. 1 illustrates a data protection system 106 (e.g., DELL-EMC Data Domain) that is configured to provide data protection operations for a production system 102. The production system 102 may be associated with data stored in the production storage 104. The data protection system 106 may generate backups of the data stored in the production storage 104. For example, writes performed in the production system 102 may be split and written to the local tier 108 such that a copy of the data in the production storage is present in the local tier 108. Over time, some of the data stored in the local tier 108 may be moved to a cloud tier 112 in the cloud 110 (e.g., a datacenter that provides cloud-based storage).

The local tier 108 can store data in different manners. The local tier 108 may include a backup, a plurality of backups, PiT (point-in-time) backups, and the like. The data protection system 106 may generate cloud objects by packaging the data in the local tier into the objects that will be moved to the cloud tier 112. The data protection system 106 may also perform other data protection operations on the data in the local tier 108 (and/or the cloud tier 112) such as deduplication, compression, encryption, garbage collection, and the like or combination thereof).

The data protection system 102 may also include a verification engine 114 that is configured to verify data written to the cloud tier 112 without incurring substantial costs such as cloud egress costs. Further, data written to the cloud tier 112 can be verified with reduced latencies. The verification engine 114 may include components or modules that operate, respectively, at local and cloud environments or at the local tier and at the cloud tier. In one example, a local verifier engine may coordinate with a cloud verifier engine to perform verification operations. Each of the local verifier engine and the cloud verifier engine may include multiple modules, functions, or the like.

Figure 2:
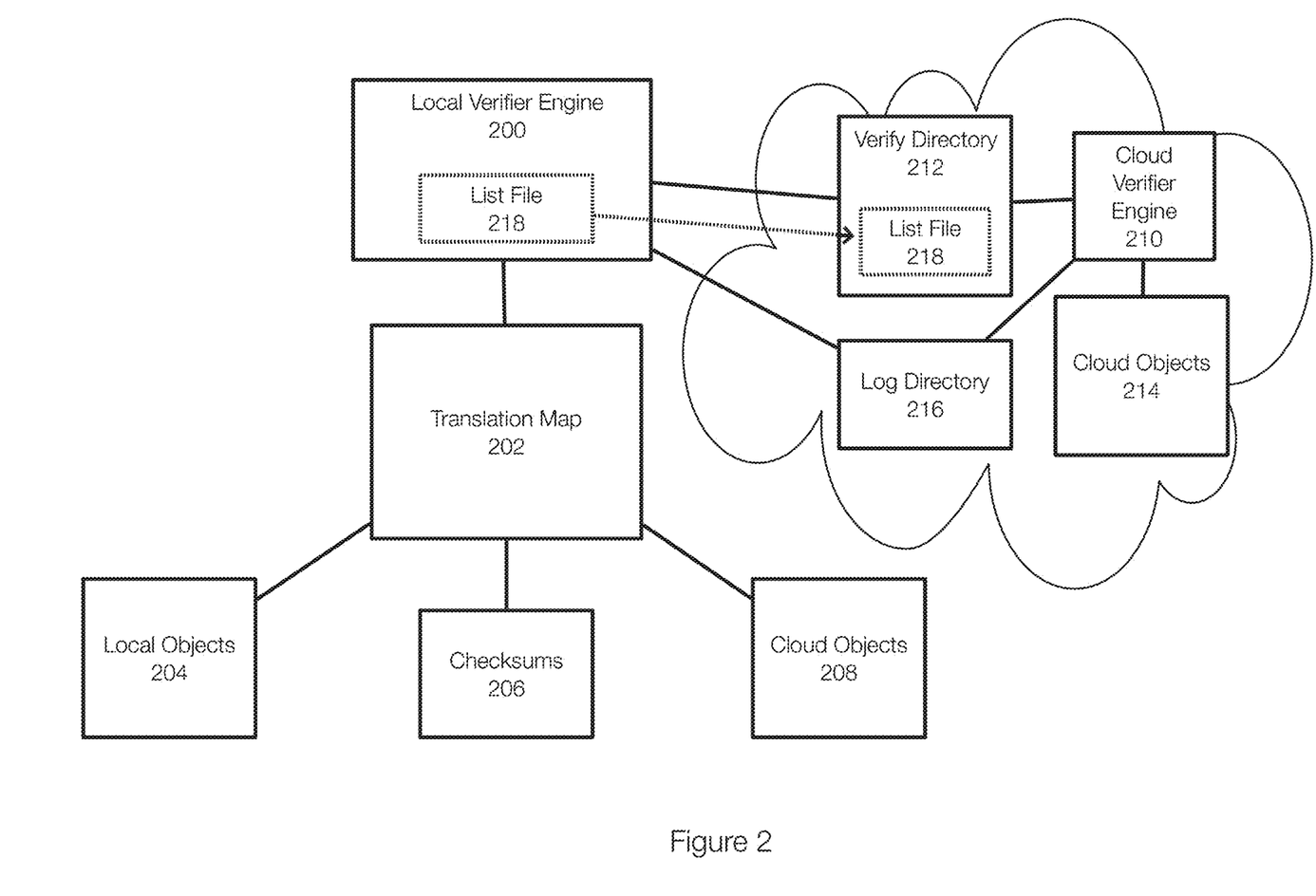
FIG. 2 discloses aspects of a verification operation performed by a local verifier engine and a cloud verifier engine.
Figure 3:
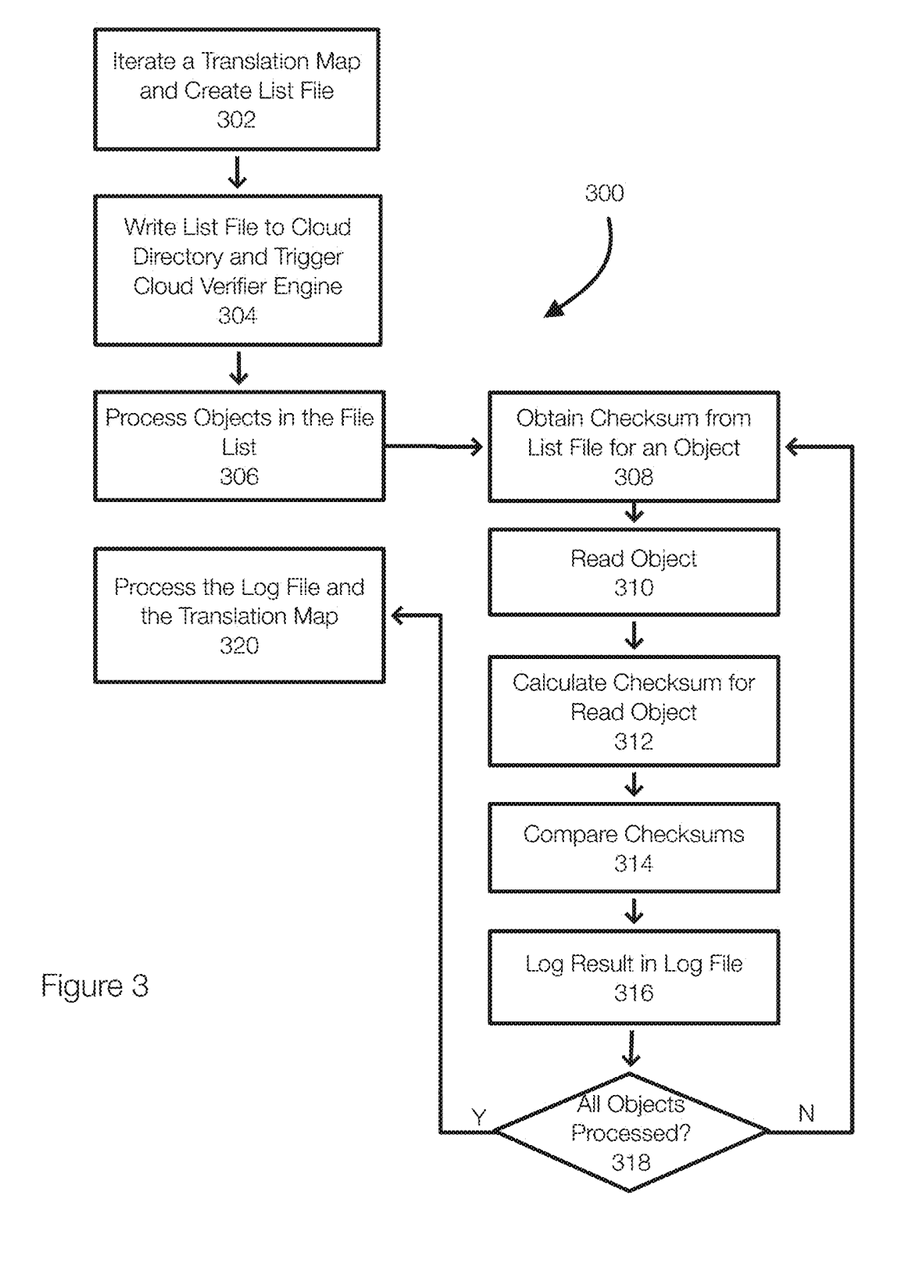
FIG. 3 discloses aspects of a method for performing a verification operation.
Figure 4:
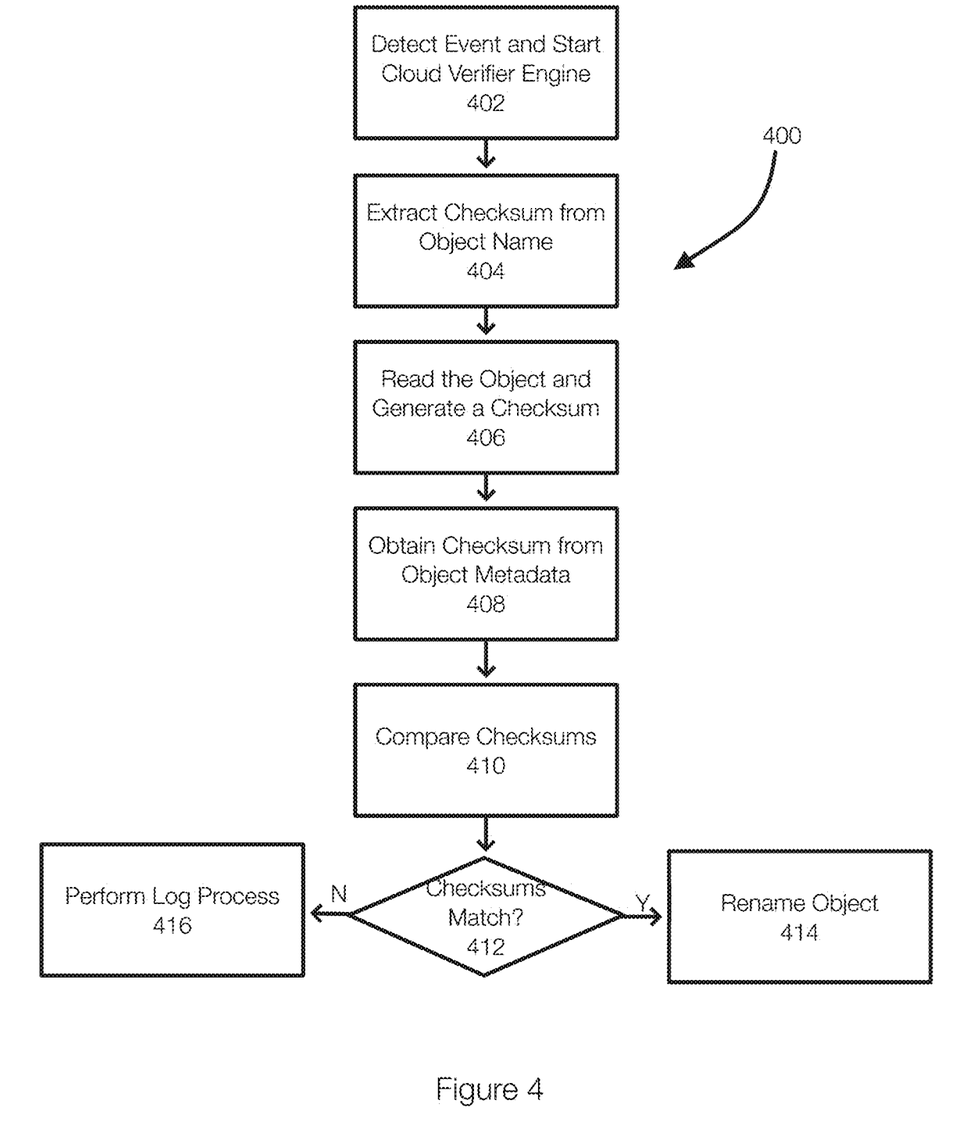
FIG. 4 discloses aspects of a method for performing a verification operation.

Embodiments of the invention allows corruptions to be identified as objects are being committed to the cloud tier or later, from the data protection system 106. Embodiments of the invention may verify objects written to the cloud tier 112 in different manners. FIGS. 2-3 illustrate one example of verifying objects written to the cloud tier 112 and FIG. 4 illustrates another example of verifying objects written to the cloud tier.

FIG. 2 illustrates an example of a data protection system that verifies objects written to the cloud tier using verifiers. FIG. 2 illustrates a local verifier engine 200, which may be operating in a data protection system associated with the local tier and/or the cloud tier. The local verifier engine 200 may include or maintain a translation map 202 that establishes relationships between local objects 204, checksums 206, and cloud objects 208, that are written to the cloud in a data movement process. The translation map 202 may store these relationships as a key-value store or map. The local verifier 200 and the translation map 202 may also account for storage format. The translation map 202 is created or maintained such that all objects transmitted or moved to the cloud tier are present in the translation map until verified.

Multiple translation maps may exist. For example, the data protection system may send objects to the clouds in batches. When a batch is transmitted, a translation map may be associated with the objects included in the batch.

By way of example and not limitation, data in the local tier may be stored as segments. A cloud object may be composed of multiple segments. For example, a cloud object with id 123a567 may be created from segments in the local tier with identifiers 10a011 and 10b012. If the checksum of the new cloud object is 0f46fc5d94f9cdff824cbe5b96735803, then the translation map 202 may have an entry as follows "123a567"  {objs:[10a011, 10b012], cksum: "0f46fc5d94f9cdff824cbe5b96735803}"

The translation map 202 thus stores these relationships. This information allows, in one example, a corrupt cloud object to be reconstructed from its segments. More specifically, the translation map 202 may also container other information, such as information needed by the data protection system to reconstruct the cloud object if necessary. This information may include segment information or identifiers. All of the objects written to the cloud tier have an entry in the translation map 202. In one example, the existence of an entry for a cloud object in the translation map 202 indicates that the verification for that cloud object is still pending. The entry may be removed when verification is completed or confirmed.

In one embodiment, once an object is moved to the cloud tier, a verification operation may be invoked. Part of the verification operation may be performed by the local verifier engine 200 and part of the verification operation may be performed by the cloud verifier engine 210. The cloud verifier engine 210 may be implemented using lambda functions, cloud tasks, orchestrator functions, or the like.

The local verifier engine 200 may iterate the translation map 202 to obtain a list of cloud object identifiers and checksums corresponding to objects that have not been verified. The local verifier engine 200 then writes a tuple to a list file 218. The tuple may include the cloud object id, the cloud object path, and the checksum. In other words, the list file 218 identifies objects that have been moved to the cloud but are not yet verified.

The object list file 218 may be moved to the cloud and stored in a verify directory 212. The verify directory 212 may be temporary or permanent. In one example, the verify directory 212 is in the same bucket in which objects are stored including the objects being verified. The objects being verified may be stored in another bucket or location however.

Once the list file 218 is delivered to the verify directory 212, the cloud verifier engine 210 may begin processing the list file 218. This may be handled, by way of example, via a lambda function or cloud function trigger that occurs from the data protection system after writing the list file 218. Writing the list file 218, for example, may trigger the cloud verifier engine 210. For example, the cloud verifier engine 210 may access the list file 218 from the verify directory 212 and read the objects in the list file 218. The cloud verifier engine 210 reads an object from the cloud objects 214 based on the list file 218. For each object, the cloud verifier engine 210 reads the object and metadata and generates a checksum from the object that was read. In this example, there is no egress cost because the read is performed in the cloud.

Next, the cloud verifier engine 210 compares checksums. In one example, three checksums are compared: the checksum in the list file 218 received from the local verifier engine 200, the checksum generated from the object read from the cloud objects 214, and the checksum retrieved from the object's metadata. If there is a mismatch or error, an entry is made in the log directory 216 for that object. The entry may include the object's details and the checksums that were compared. In one example, entries may be made for every object for which verification is performed. Some entries may indicate that verification was successful while other entries may indicate that the verification failed. In another embodiment, the entries in the log directory (or log file in the log directory) may only identify objects that were not verified.

Once the cloud verifier engine 210 completes the verification for the objects in the list file 218, the log reflecting the object verifications in the log directory 216 may be accessed by the local verifier engine 200. The local verifier engine 200 may take corrective actions on the objects that failed verification.

More specifically, the local verifier engine 200 may iterate the translation map 202 and remove entries for the objects that were successfully verified (e.g., no mismatch between the various checksums). For the objects that were not successfully verified, the objects may be reconstructed using data in the local tier. The reconstructed objects are re-written to the cloud tier. In one example, the local segment identifiers recorded in the translation map are used during the reconstruction process. The objects rewritten to the cloud follow the same verification process discussed herein. As these objects are moved to the cloud, they will be reflected in the translation map 202 and verified. Only when verification is successful are the entries removed from the translation map.

In one example, a garbage collection operation may be configured to refer to the translation map when reclaiming space in the local tier. The garbage collection will not remove segments in the local tier, corresponding to cloud objects that have not been successfully verified. This ensures that the cloud objects can be reconstructed when a mismatch is found during the verification operation.

FIG. 3 discloses aspects of performing a verification operation. As previously stated, the data protection system maintains a translation map to store key value pairs related to objects that are being or have been moved to the cloud tier from the local tier.

The method 300 may begin by invoking a local verifier engine that may iterate the translation map and create 302 a list file. Typically, the verification operation is only invoked for objects that have been moved to the cloud. The verification operation is not performed for objects that are in the process of being moved to the cloud tier or are being prepared for movement to the cloud tier.

The list file includes, in one example, at last an object identifier, an object path, and a checksum. The checksum was generated at the local tier for the object. The list file contains tuples for one or more objects.

Once the list file is prepared, the list file is written 304 to a cloud directory (e.g., a verify directory, which may be a temporary directory that is deleted once all objects in the list file have been processed). In one example, the verify directory is created each time a verification operation is performed. The temporary directory may also store the log files and other files related to the verification operation. Once the list file is stored in the verify directory, the cloud verifier engine is triggered or executed.

The cloud verifier engine processes 306 the objects identified in the list file. A verification of each object in the list file is performed. More specifically, for each object identified in the list, a checksum is obtained 308 from the list file. The object is then read 310 from the cloud tier using the object's location in the cloud tier and a checksum is calculated 312 for the read object. The checksum of the object included in the object's metadata may also be obtained.

Next, the checksums are compared 314. The result of the comparison (e.g., success or failure) may be logged 316 in a log file. If all objects in the list file are processed (Y at 318), the process continues by processing the log file and the translation map 320.

More specifically, when all of the objects in the list file have been processed, a completion marker (e.g., date/time of completion) may be added to the verify directory or to the log file associated with the list file. The local verifier engine may receive a notification that the cloud verifier engine is finished or may periodically poll the log file for the presence of the completion marker in the log file or in the verify directory.

When the completion marker is found, the log file may be read by the local verifier engine. In one example, the log file only contains the objects that were not verified. Alternatively, the log file may include a path of a new object that contains the mismatched entries.

The local verifier engine retrieves the log file and processes each object in the log file. For example, the local verifier engine may iterate the translation map for each object. The translation map is processed based on the format of the log file. For example, if the log file only identifies objects that were not verified, objects in the translation map but not in the log file are removed from the translation map. If the log file includes an entry for each object and a status (e.g., failure or success), then the objects successfully verified are removed from the translation map. After the log file is processed, the translation map contains only entries for objects that were not verified.

For the mismatched or unverified objects in the log file or the objects that failed the verification process, the data protection system regenerates those cloud objects using the local identifiers stored in the translation map and rewrites the regenerated cloud objects to the cloud tier. As these regenerated objects are written to the cloud tier, new entries are made in the translation map and these regenerated objects will be subject to verification.

In one example, a new translation map may be generated and the same verification steps will be performed. This allows the old translation map to be deleted. In another example, the same translation may can be used because it only contains or references objects that failed the verification process. In either case, the information needed to reconstruct the objects that failed verification is present in the translation map. Once the verification process is completed, the files in the verify directory may be deleted. In addition, no reclamation is needed because the same objects are being overwritten.

In one example, the verification operation can be scaled. For example, the list file may be separated or parsed to split the workload among multiple workers in the cloud verifier engine. This may reduce the time required to verify the objects listed in the list file.

FIG. 4 discloses aspects of another method for performing a verification operation. Generally, the method 400 differs from the method 300 in that the objects are verified essentially as the objects are created in the cloud tier. The method 400 can also be scaled such that multiple objects can be verified in parallel. This may eliminate the need for a list file.

The method 400 may begin when an event, such as writing an object to the cloud tier, is detected 402. This type of event is an example of a trigger for a function such as the cloud verifier engine. In this example, when objects are written to the cloud, the checksum generated at the local tier is added or appended to the object's name. Thus, the cloud verifier engine may extract 404 the checksum from the object's name rather than a list file. The cloud verifier engine may also read 406 the object and generate a checksum from the read object. After obtaining 408 a third checksum from the object's metadata, the cloud verifier engine may compare 410 these checksums as previously described.

If the checksums match (Yes at 412), the object is renamed such that the appended checksum is removed. If there is a mismatch or the checksums do not all match (No at 412), a log process 416 is performed.

In the log process 416, a log file is generated that identifies the objects that were not successfully verified. The local verifier engine can retrieve or access the log file and process the log file and the translation map as previously described. The log file and the translation map are processed such that verified objects are removed from the translation map and objects that are not verified are reconstructed and rewritten to the cloud and a subsequent verification operation is performed on the reconstructed objects.

Figure 5:
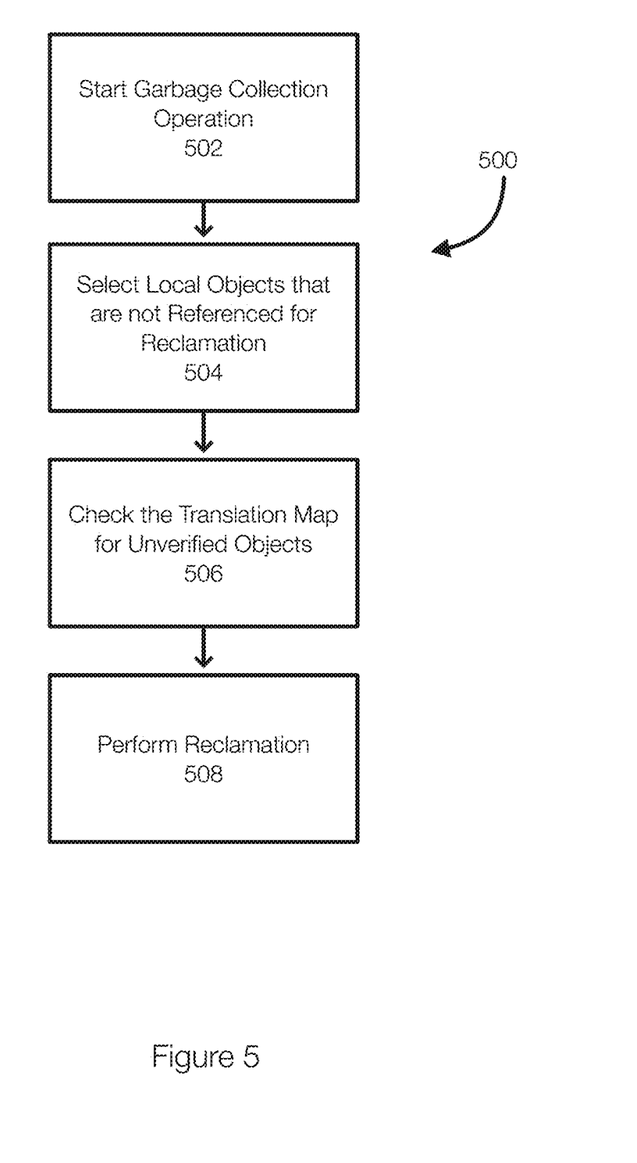
FIG. 5 discloses aspects of a garbage collection operation.

FIG. 5 illustrates an example of a garbage collection operation to reclaim space in the local tier. In the method 500, the garbage collection may be initiated 502. Local objects that are not referenced 504 are selected for reclamation. For example, segments that are not used for deduplication (not referenced by any file anymore) or are no longer needed for other reasons may be deleted.

In one example, the translation map is checked 506 to determine if any objects are not yet verified. If the garbage collection operation has identified segments that are associated with the unverified objects, those segments are excluded from reclamation when the garbage collection operation is performed 508. When the objects corresponding to those segments are verified, the segments can be reclaimed if not otherwise needed in the local tier.

In one example, the segment references in the cloud object that is yet to be verified is a subset of the segment reference set in the local tier until the garbage collection operation is performed. Once the cloud object is verified, the corresponding local objects are free for reclamation based on their liveness. In other words, segments are considered live due to an unverified cloud object.

Figure 6:
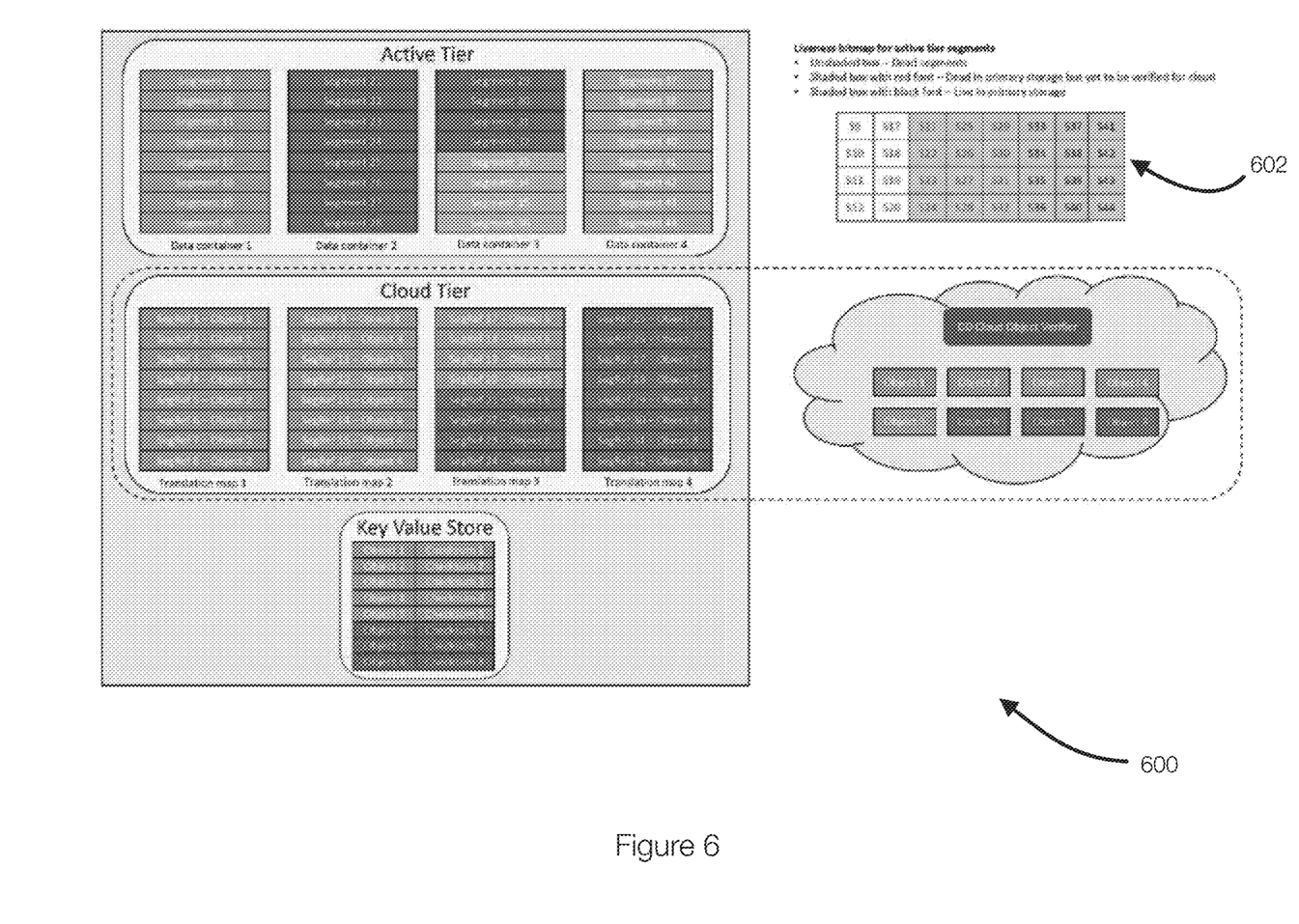
FIG. 6 illustrates aspects of data verification.

FIG. 6 discloses aspects of data verification. A color copy of FIG. 6 is attached as an appendix and reference is made to the corresponding colors. The tables 600 illustrates an local tier that includes data containers 1, 2, 3, and 4. Each of the data containers includes segments. The cloud tier in FIG. 6 is associated with translation maps 1, 2, 3, and 4. The translation map 1 relates segment references 1-8 to corresponding objects in the cloud. The translation maps 2, 3, and 4 similarly relate segment references to objects in the cloud. For example, segment references 1, 2, 3, and 4 are associated with object 1 in the cloud tier. For ease of understanding, FIG. 6 is provided for illustration purposes. FIG. 6 illustrates the translation map as key-value pairs in the key value store with only the object and the checksum. However, the information may be more robust and may include: cloud object: local objects checksum.

In this example, objects 1, 2 and 4 (in green in the cloud tier) in the cloud tier have been validated and garbage collection has been performed in the local tier. As a result, the segments 1-8 and 13-16 are not present in the local tier as the corresponding objects 1, 2 and 4 have been validated.

The objects 3 and 5 (in orange in the cloud tier) have been validated in the cloud tier and are ready to be reclaimed in the local tier. Thus, the local tier in FIG. 6 illustrates segments 9-12 and 17-20 in the local tier are ready for garbage collection.

The objects 6, 7, and 8 in the cloud tier (in red) are pending verification. As far as the local tier is concerned, the segments 21-32 may be dead and could be reclaimed. However, embodiments of the invention prevent these segments from being reclaimed until the corresponding cloud objects are verified.

The segments in gray in the local tier (segments 33-44) are specific to the local tier and have not yet been written to the cloud. Thus, no verification is pending. Their liveness is established by enumerating files in the name space and a liveness map is built accordingly. The liveness bitmap 602 represents the liveness of local tier segments. For example, the first two columns in the bitmap 602 represent dead segments in the local tier or segments that can be reclaimed by garbage collection. Columns 3-5 in the bitmap 602 represent segments that are dead in the local tier but are not yet verified. These segments are not garbage collected until after verification of the corresponding cloud objects. Columns 6-8 in the bitmap 602 represent segments that are live in the primary storage and correspond to objects that have not been moved to the cloud tier.

Embodiments of the invention effectively perform a verification operation (e.g., read-verify or read-verify-fix) efficiently because the read-verify is performed in the cloud using lambda/cloud functions that execute in the cloud. This reduces latencies and cost is relatively low because the objects are verified without reading the objects from outside of the cloud tier. The use of cloud functions/lambda functions—accessing data within the cloud—ensures that the TCO (total cost of ownership) remains at very low—where the billing happens only for the execution times of the functions and does not contain any data egress costs.

This method also ensures that reconstruction and re-write of any corrupt objects in the cloud is still possible by configuring the garbage collection such that object deletions in the local tier are delayed for objects whose verification is still pending. The verification operation can also be parallelized using cloud function orchestrators such that multiple objects can be verified in parallel, which significantly reduces the total verification time.

Embodiments of the invention can be used with data protection systems that perform deduplication and that do not perform deduplication. Embodiments of the invention help ensure the integrity of the backup data moved to the cloud tier by only deleting local tier copies once the cloud objects are verified.

In one example, the cloud verifier engine is initially configured, the functions of the cloud verifier engine may be deployed and other aspects may also be defined such as credentials, rules, REST endpoints, and the like. A logging service may also be configured (e.g., AWS Cloudwatch, Azure Monitor or GCP Stackdriver, or any other similar service).

In one example, the cloud verifier engine may have a function configured to access a cloud object and verify its checksums and report any mismatches to the configured log services. It will also report any errors to the same log service. The cloud verifier engine may have an exporter function configured to export the mismatch or verification failure details to an object that can be accessed by the local verifier engine.

The cloud verifier engine may be configured such that only object identifiers since the last export are exported.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, backup operations, restore operations, verification operations, read-verify-fix operations, or the like or combination thereof. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or container instances.

Particularly, devices in the operating environment may take the form of software, physical machines, VMs or container instances or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, objects, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: generating a list file that includes entries from a translation map, wherein each entry identifies a cloud object stored in a cloud tier or storage and a first checksum of the cloud object, wherein the first checksum was generated at an local tier, verifying cloud objects associated with the entries in the list file by, for each entry: reading a cloud object at the cloud tier or cloud storage; generating a second checksum from the cloud object read from the cloud tier or cloud storage; comparing the first checksum and the second checksum, wherein the cloud object is validated when the first and second checksums match and wherein the cloud object is not validated when there is a mismatch between the first and second checksums; and logging the mismatch in a log file, and processing the log file, by the local verifier engine, wherein entries in the translation map corresponding to objects not referenced in the log file or that are identified as verified are removed from the translation map.

Embodiment 2. The method of embodiment 1, further comprising reconstructing cloud objects that were not verified.

Embodiment 3. The method of embodiments 1 and/or 2, further comprising iterating the translation map.

Embodiment 4. The method of embodiment 1, 2, and/or 3, further comprising, for each entry in the list file, extracting a third checksum from the cloud object's metadata.

Embodiment 5. The method of embodiment 1, 2, 3, and/or 4, further comprising comparing the first, second and third checksums.

Embodiment 6. The method of embodiment 1, 2, 3, 4, and/or 5, further comprising reconstructing objects in the log file from the local tier based on information included in the translation map.

Embodiment 7. The method of embodiment 1, 2, 3, 4, 5, and/or 6, further comprising performing garbage collection at the local tier, wherein data corresponding to objects identified in the translation map are not reclaimed during the garbage collection.

Embodiment 8. A method, comprising: verifying objects by:
receiving objects at a cloud tier for storage in the cloud tier, after writing the objects to the cloud tier, performing for each object by a cloud verifier engine: extracting a first checksum from a name of the object, reading the object and generating a second checksum from the read object, comparing the first and second checksums, and logging the object in a log file when there is a mismatch between the first and second checksums, and processing the log file, by the local verifier engine, wherein entries in the translation map corresponding to objects not referenced in the log file or that are identified as verified are removed from the translation map.

Embodiment 9. The method of embodiment 8, wherein writing the objects to the cloud tier triggers the cloud verifier engine.

Embodiment 10. The method of embodiment 8 and/or 9, further comprising reconstructing the objects in the log file from segments stored in the local tier, wherein the reconstructed objects are added to a translation map.

Embodiment 11. The method of embodiment 8, 9, and/or 10, further comprising verifying the reconstructed objects after the reconstructed objects are committed to the cloud tier.

Embodiment 12. The method of embodiment 8, 9, 10, and/or 11, further comprising verifying the objects in a parallel manner such that multiple objects are verified at the same time.

Embodiment 13. A method for performing any of the operations, methods, or processes, or any portion of any of these or combination thereof, disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment. The computing environments may each include one or more processors, memory of different types, storage devices, network hardware, user interfaces of various types including hardware and/or software, graphical user interfaces, or the like.

Figure 7:
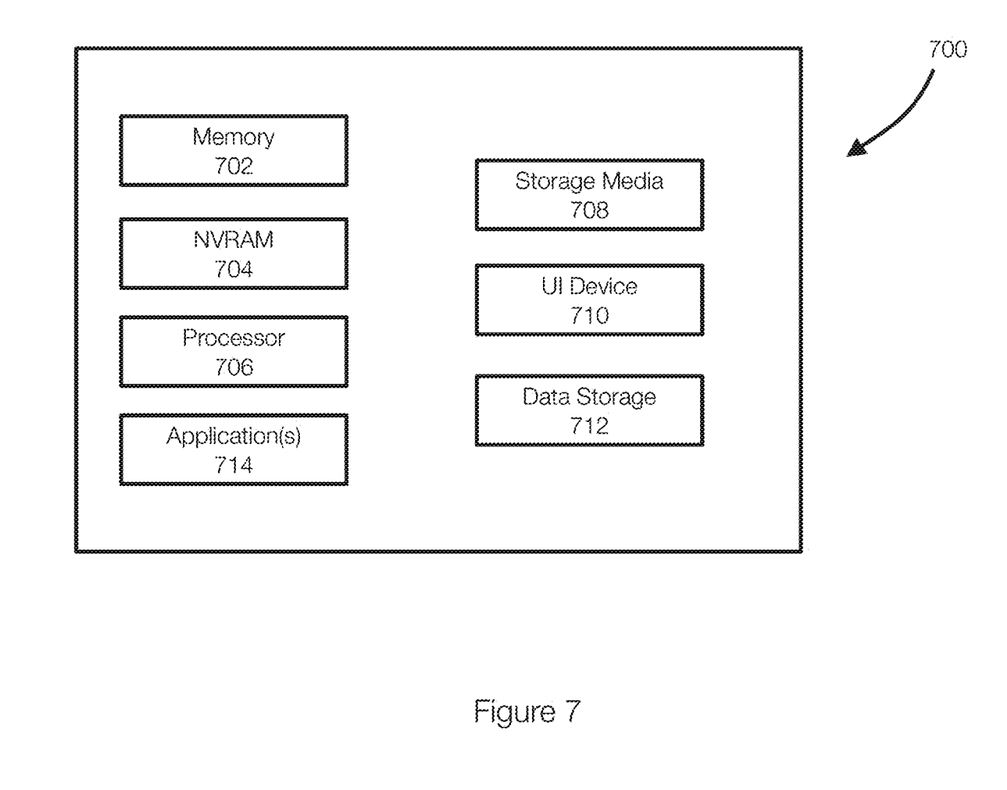
FIG. 7 illustrates aspects of a computing environment.

With reference briefly now to FIG. 7 any one or more of the entities disclosed, or implied, herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating a list file that includes entries from a translation map, wherein each entry identifies a cloud object stored in a cloud storage, a first checksum of the cloud object, and segments stored in a local tier corresponding to the cloud object, wherein the first checksum was generated at the local tier;
    verifying cloud objects associated with the entries in the list file by, for each entry:
    reading a cloud object at the cloud storage;
    generating a second checksum from the cloud object read from the cloud storage;
    retrieving a third checksum from metadata of the cloud object;
    comparing the first checksum, the second checksum and the third checksum, wherein the cloud object is validated when the first, second and third checksums match and wherein the cloud object is not validated when there is a mismatch between the first, second, and third checksums; and
    logging the mismatch in a log file; and
    processing the log file, by the local verifier engine, wherein entries in the translation map corresponding to objects not referenced in the log file or that are identified as verified are removed from the translation map.

2. The method of claim 1, further comprising reconstructing cloud objects that were not verified.

3. The method of claim 1, further comprising iterating the translation map.

4. The method of claim 1, wherein the third checksum is generated before the cloud object is written to a disk.

5. The method of claim 1, further comprising reconstructing objects in the log file from the local tier based on the segments identified in the translation map.

6. The method of claim 1, further comprising performing garbage collection at the local tier, wherein data corresponding to objects identified in the translation map are not reclaimed during the garbage collection.

7. A non-transitory storage medium having stored therein instructions that are executable by one or more hardware processors to perform operations comprising:
    generating a list file that includes entries from a translation map, wherein each entry identifies a cloud object stored in a cloud storage, a first checksum of the cloud object, and segments stored in a local tier corresponding to the cloud object, wherein the first checksum was generated at the local tier;
    verifying cloud objects associated with the entries in the list file by, for each entry:
    reading a cloud object at the cloud storage;
    generating a second checksum from the cloud object read from the cloud storage;
    retrieving a third checksum from metadata of the cloud object;
    comparing the first checksum, the second checksum and the third checksum, wherein the cloud object is validated when the first, second and third checksums match and wherein the cloud object is not validated when there is a mismatch between the first, second, and third checksums; and
    logging the mismatch in a log file; and
    processing the log file, by the local verifier engine, wherein entries in the translation map corresponding to objects not referenced in the log file or that are identified as verified are removed from the translation map.

8. The non-transitory storage medium of claim 7, further comprising reconstructing cloud objects that were not verified.

9. The non-transitory storage medium of claim 7, further comprising iterating the translation map.

10. The non-transitory storage medium of claim 7, wherein the third checksum is generated before the cloud object is written to a disk.

11. The non-transitory storage medium of claim 7, further comprising reconstructing objects in the log file from the local tier based on the segments identified in the translation map.

12. The non-transitory storage medium of claim 7, further comprising performing garbage collection at the local tier, wherein data corresponding to objects identified in the translation map are not reclaimed during the garbage collection.

13. A method comprising:
    verifying objects by: receiving objects at a cloud tier for storage in the cloud tier, wherein names of the objects are appended with corresponding checksums generated at a local tier;
    after writing the objects to the cloud tier, performing for each object by a cloud verifier engine: extracting a first checksum from a name of the object; reading the object and generating a second checksum from the read object; comparing the first and second checksums; and logging the object in a log file when there is a mismatch between the first and second checksums;

renaming the objects when the first and second checksums match;

and processing the log file, by the local verifier engine, wherein entries in the translation map corresponding to objects not referenced in the log file or that are identified as verified are removed from the translation map.

14. The method of claim 13, wherein writing the objects to the cloud tier triggers the cloud verifier engine.

15. The method of claim 14, further comprising reconstructing the objects in the log file from segments stored in the local tier, wherein the reconstructed objects are added to a translation map.

16. The method of claim 15, further comprising verifying the reconstructed objects after the reconstructed objects are committed to the cloud tier.

17. The method of claim 13, further comprising verifying the objects in a parallel manner such that multiple objects are verified at the same time.

18. A non-transitory computer readable medium comprising computer executable instructions for performing the method of claim 13.

* * * * *